July 4, 1950 | E. WATKINSON | 2,514,267

TONE CONTROL AND FEEDBACK CIRCUITS FOR AUDIO FREQUENCY AMPLIFIERS

Filed Aug. 19, 1946

ERIC WATKINSON
INVENTOR

BY Lee B. Kemon.
ATTORNEY

Patented July 4, 1950

2,514,267

UNITED STATES PATENT OFFICE 2,514,267

TONE CONTROL AND FEEDBACK CIRCUITS FOR AUDIO FREQUENCY AMPLIFIERS

Eric Watkinson, Sydney, New South Wales, Australia, assignor to Hartford National Bank & Trust Company, Hartford, Conn., as trustee Application August 19, 1946, Serial No. 691,641
In Australia July 13, 1945

Section 1, Public Law 690, August 8, 1946
Patent expires July 13, 1965

4 Claims. (Cl. 179—171)

This invention relates to audio frequency amplifier circuits, having provision for upper frequency response attenuation control, and including a network whereby negative or inverse feedback is obtained.

Under certain circumstances, it is desirable that an audio frequency amplifier should have a sharp cut-off at a particular frequency and be provided with frequency response attenuator means, usually called a tone control, whereby the cut-off frequency can be changed, such for example, is the case in broadcast radio receivers. In the broadcast band radio broadcasting stations are allocated frequencies differing from each other by 10 kilocycles per second and in other bands by 5 kilocycles per second. In order to adjust the radio receiver to optimum conditions and minimize interference from adjacent stations where receiving a particular station, it is desirable to restrict the range of frequencies to which the audio frequency amplifier of the receiver responds; in some cases, an upper limit of approximately 6,000 cycles per second is desirable, in other cases, an upper limit of about 3,000 cycles per second is required whilst, in other instances, an upper limit between these frequencies is desired.

The primary object of this invention is to provide an improved circuit for an audio frequency amplifier whereby the frequency response characteristic of the amplifier at the high audio frequencies has a sharp cut-off at a particular frequency which cut-off frequency can be modified by a tone control. A further object of the invention is to include in such an amplifier a negative feedback network or networks en ensure adequate damping of the loudspeaker and freedom from severe harmonic distortion.

It is proposed to achieve such objects by means of a tuned circuit in the cathode circuit of a driver valve, in conjunction with negative feedback networks operable from the output stage of the amplifier.

The invention will be more readily understood from one practical embodiment thereof, which will now be described with reference to the drawings accompanying the provisional specification in which.

Figure 1:
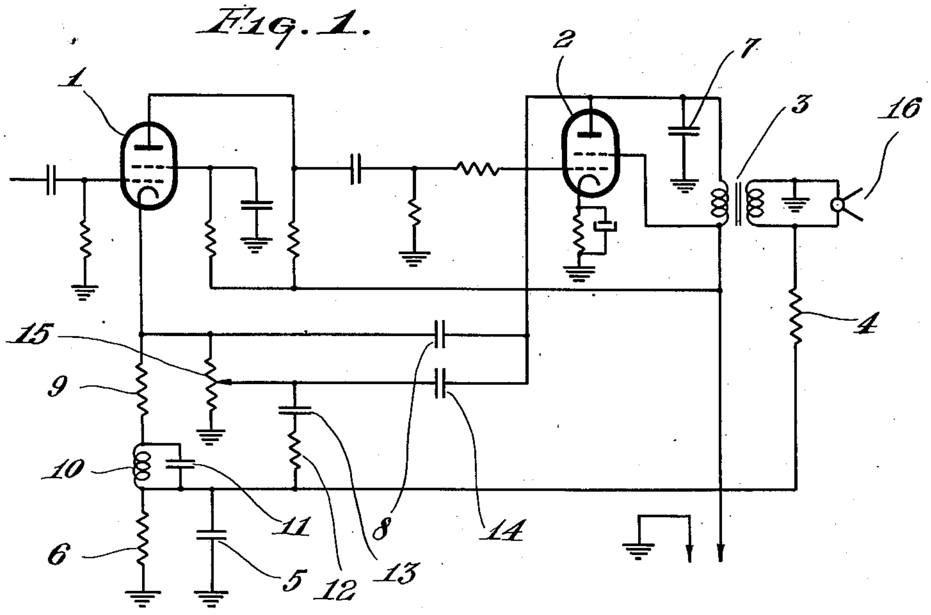
Figure 1 is the circuit diagram of an audio frequency amplifier such as employed in a radio receiver which embodies the invention; the power supply circuits being omitted for convenience.

Referring to Figure 1, the numeral 1 represents a voltage amplifying driver valve in a driver stage and the numeral 2 a power output valve in an output stage which includes a loud speaker 16 and an output transformer 3.

Included in the cathode to earth circuit of valve 1 is a resistance 9, a tuned circuit formed by the inductance 10 and capacitance 11, and resistance 6 with its by-pass condenser 5. Also connected between the cathode of valve 1 and earth is a potentiometer 15 which functions as the attenuator control means, or tone control, the operation of which will be hereinafter described.

Negative feedback over the whole of the amplifier is provided by a circuit connected from the secondary winding of the transformer 3 to the cathode circuit of the amplifier tube 1. This circuit includes a resistance 4 and the feedback voltage is developed across resistance 6 which is shunted by a by-pass condenser 5. The condenser 5 reduces the feedback voltage at the high audio frequencies, and similarly the condenser 7 reduces the high audio frequency voltages in the output circuit of valve 2.

The feedback circuit just described will hereinafter be termed the "fixed feedback loop" although, as will be seen, it is subject to some modification by the tone control potentiometer 15.

A "second feedback loop" circuit is provided from the anode of valve 2 to the cathode of valve 1, via the condenser 8.

The tuned circuit 10, 11 is tuned approximately to the highest frequency at which cut off is desired, i. e. in the example above mentioned, 6000 cycles per second.

The moving arm of the potentiometer 15 is connected to the anode of valve 2 via the condenser 14; and to the high potential end of resistance 6 via the network including the condenser 13 and resistance 12.

Figure 2:
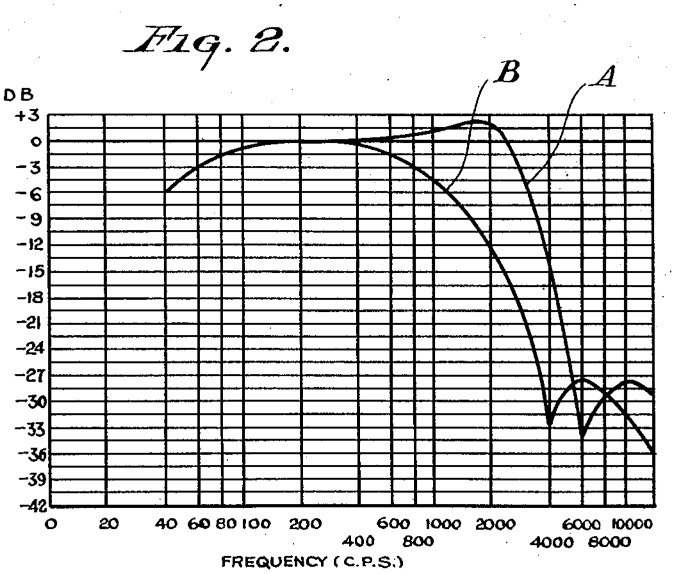
Figure 2 shows the output frequency response characteristics of the amplifier, under typical operating conditions, in graphical form.

The operation of this circuit will be better understood from the following description, read in conjunction with Figures 1 and 2.

When the moving arm of the potentiometer 15 is at the earth end, a considerable amount of feedback takes place via the "second feedback loop" which feedback will vary with frequency being at a maximum at a frequency approximating that to which the tuned circuit 10, 11 is tuned; in the example 6000 cycles per second.

Hence the overall gain of the amplifier at this frequency will be small.

The "fixed feedback loop" will introduce feedback at all frequencies but this feedback decreases for the high audio frequencies as a result of the condenser 5 and the resistance condenser network 12, 13, which shunt the resistance 6.

The output frequency response characteristic of the amplifier with the arm of the potentiometer 15 at the earth end is shown by the curve A in Figure 2. It will be seen that the least gain occurs at 6000 cycles per second whilst a peak occurs at a frequency of approximately 2000 to 1500 cycles per second, this being caused by the previously mentioned shunting effect of the condenser 5 and the network comprising resistance 12 and condenser 13.

The curve B in Figure 2 depicts the output frequency response characteristic of the amplifier when the arm of the potentiometer 15 is at the end connected to the cathode of valve 1 or the end farthest from earth, and it will be observed that this curve shows maximum attenuation at 4000 cycles per second, sloping smoothly from maximum gain at approximately 400 cycles per second.

The maximum attenuation at 4000 cycles per second is caused by the condenser-resistance network 13, 12 now being effectively in shunt with the tuned circuit 10, 11.

Decreasing the resonant frequency of the tuned circuit in this manner decreases its dynamic resistance, but this may be offset by connecting a condenser 14 in parallel with the condenser 8 thus increasing the feedback.

When the arm of the potentiometer 15 is adjusted to an intermediate position the maximum attenuation occurs at a frequency between 6000 cycles per second and 4000 cycles per second. The potentiometer thus provides a variable control whereby a gradual variation in the cut-off frequency may be obtained.

The resistance 9 and 12 to some extent control the slope of the frequency response characteristic curves A and B when approaching the position of maximum attenuation. The condenser-resistance network 13, 12 is removed from its position across resistance 6 by moving the arm of the potentiometer thus the peak evidence in curve A is removed.

The invention has been more particularly described with reference to audio frequency amplifiers in broadcast radio receivers, but it is to be understood that the invention may, with facility, be beneficially applied, as desired, to other types of audio frequency amplifiers.

Having now described my invention, what I claim as new and desire to secure by Letters Patent is:

1. An audio frequency amplifier having a high frequency cut-off comprising: a driver stage including a valve; an output stage also including a valve; a fixed negative feedback from the secondary of the output transformer to a point on the cathode circuit of the driver valve; a second feedback circuit from the output of the output valve to another point on the cathode circuit of the driver valve; a tuned parallel circuit in the circuit of the cathode of the driver valve between said points, said circuit being resonant at the highest frequency at which cut-off is desired; and tone control means including a resistor condenser network and a potentiometer connected in shunt with said resonant circuit to gradually vary the cut-off frequency.

2. An audio frequency amplifier having a high frequency cut-off comprising a driver stage including a first electron discharge tube having a cathode, a grid and an anode, the audio signal to be amplified being applied to said grid, a negative feedback resistance connected between said cathode and a point of ground potential, and a parallel-resonant circuit interposed between said cathode and said resistance, said circuit being resonant at the highest frequency at which cut-off is desired, an output stage including a second electron discharge tube having a cathode, a grid and an anode, the grid of said second tube being coupled to the anode of said first tube, and an output transformer having a primary winding and a secondary winding, the primary winding being coupled to the anode of said second tube, a first negative feedback path connected between the anode of said second tube and the cathode of said first tube, a second negative feedback path connected between the secondary winding and the junction of said resonant circuit and said resistance, and a variable impedance network coupled to said resonant circuit for varying the cut-off frequency thereof.

3. An arrangement, as set forth in claim 2, wherein said variable network is constituted by a potentiometer having a resistance element connected between the cathode of said first tube and said point of ground potential and an adjustable arm on said element, a resistor, and a capacitor connected in series with said resistor between said arm and said junction.

4. An arrangement, as set forth in claim 2, further including a condenser connected across said feedback resistance and having a value by-passing the relatively high frequency signals in the range of audio frequency signals applied to said amplifier.

ERIC WATKINSON.

REFERENCES CITED

The following references are of record in the file of this patent:

UNITED STATES PATENTS

| Number | Name | Date |
|---|---|---|
| 2,034,226 | Carter | Mar. 17, 1936 |
| 2,093,245 | Van Loon | Sept. 14, 1937 |
| 2,250,598 | Neeteson | July 29, 1941 |
| 2,256,072 | Bruck | Sept. 16, 1941 |
| 2,264,715 | Rohr | Dec. 2, 1941 |